United States Patent [19]
Griswold et al.

[11] Patent Number: 5,320,413
[45] Date of Patent: Jun. 14, 1994

[54] VEHICLE SEAT ASSEMBLY WITH LINEAR ACTUATOR

[75] Inventors: Leslie Griswold, Ann Arbor; Mark Graf; John Flannery, both of Madison Heights; Cynthia L. Hernandez, Plymouth; Srinivas Bidare, Ann Arbor; Obert Burch, Detroit; David Pawczuk, Westland, all of Mich.

[73] Assignee: Hoover Universal, Inc., Plymouth, Mich.

[21] Appl. No.: 129,289

[22] Filed: Sep. 30, 1993

Related U.S. Application Data

[63] Continuation-in-part of Ser. No. 12,344, Feb. 2, 1993.

[51] Int. Cl.⁵ .............................................. B60N 2/02
[52] U.S. Cl. ..................... 297/362.12; 297/362.14; 297/361.1; 297/363
[58] Field of Search ............... 297/362.12, 362.14, 297/361.1, 363

[56] References Cited

U.S. PATENT DOCUMENTS

| | | | |
|---|---|---|---|
| 2,596,760 | 5/1952 | Bryant | 297/362.14 |
| 3,383,135 | 5/1968 | Posh | 297/362.12 |
| 4,223,946 | 9/1980 | Kluting | 297/363 |
| 4,579,386 | 4/1986 | Rupp et al. | 297/362.12 |
| 4,685,734 | 8/1987 | Brandoli | 297/362.12 |

*Primary Examiner*—Clifford D. Crowder
*Assistant Examiner*—Bibhu Mohanty
*Attorney, Agent, or Firm*—Harness, Dickey & Pierce

[57] ABSTRACT

A vehicle seat assembly with a linear actuator is disclosed in which the actuator is used to adjust the relative position of two relatively movable components of the seat assembly. The actuator includes a first part attached to one of the seat assembly components in the form of a lead screw with an external helical screw thread. A second part of the actuator, attached to the other seat component, includes a housing containing a spin nut threaded onto the lead screw. The second part further includes means for engaging the spin nut to prevent it from rotating along the lead screw and means for selectively releasing the spin nut to permit rotation about the lead screw and thereby relative movement of the actuator second part relative to the first part. A cam is mounted to the actuator second part to selectively engage and release the spin nut.

13 Claims, 5 Drawing Sheets

1

VEHICLE SEAT ASSEMBLY WITH LINEAR ACTUATOR

CROSS REFERENCE TO RELATED APPLICATIONS

This application is a continuation-in-part of application Ser. No. 08/012,344, Filed Feb. 2, 1993.

BACKGROUND AND SUMMARY OF THE INVENTION

The present invention relates to vehicle seat assemblies and in particular to vehicle seat assemblies having a linear actuator for use in a seat adjuster and/or a seat back recliner.

Manually adjustable vehicle seat assemblies typically include an adjuster for adjusting the fore and aft position of seat assembly relative to the vehicle and often a recliner for adjusting the inclination of the seat back. Such mechanisms must be capable of withstanding the loads applied to the seat assembly during a vehicle collision without an undue amount of seat travel.

To increase seat belt comfort, vehicle seat assemblies are being developed with the seat belts mounted directly to the seat assembly rather than being mounted to the vehicle structure. When the seat belts are mounted to the seat assembly, the seat belts are moved with the seat assembly during seat adjustment, rather than remaining stationary while the seat assembly is moved. This improves passenger comfort and facilitates vehicle assembly. However, with the seat belts mounted to the seat assembly, the forces applied to the recliner and adjuster mechanisms during a vehicle collision are significantly increased.

The above referenced parent patent application discloses a linear actuator which can be used as a seat adjuster or as a recliner and withstand the above mentioned seat belt loads.

The present invention, on the other hand, pertains to an improved linear actuator in which the total number of components is reduced and the actuator assembly is facilitated. The linear actuator of the present invention includes a first part attached to a first seat assembly component in the form of a lead screw with an external helical screw thread. A second part of the actuator is attached to a second seat component movable relative to the first seat component. The actuators second part includes an spin nut threaded onto the lead screw and a housing capturing the spin nut. Angular contact bearings are positioned between the spin nut and the housing, enabling the nut to rotate relative to the housing and axially capturing the nut within the housing.

A clutch at one end of the housing is axially movable between a lock position engaging one end of the spin nut to prevent rotation of the nut and a release position in which the spin nut is freed for rotation. The clutch and the spin nut include radially extending teeth that engage with one another when the clutch is in the lock position to prevent rotation of the spin nut. Axial movement of the clutch is controlled by a cam engaging an outer surface of the clutch to hold the clutch in the lock position. A spring within the housing urges the clutch away from the lock position when such motion is permitted by the cam. A cam release is provided to selectively release the cam and clutch to enable spin nut rotation. The housing is made of two housing half members joined together around the spin nut and bearings, thus facilitating assembly of the mechanism.

Further objects, features and advantages of the invention will become apparent from a consideration of the following description and the appended claims when taken in connection with the accompanying drawings.

DETAILED DESCRIPTION OF THE EMBODIMENT

Figure 1:
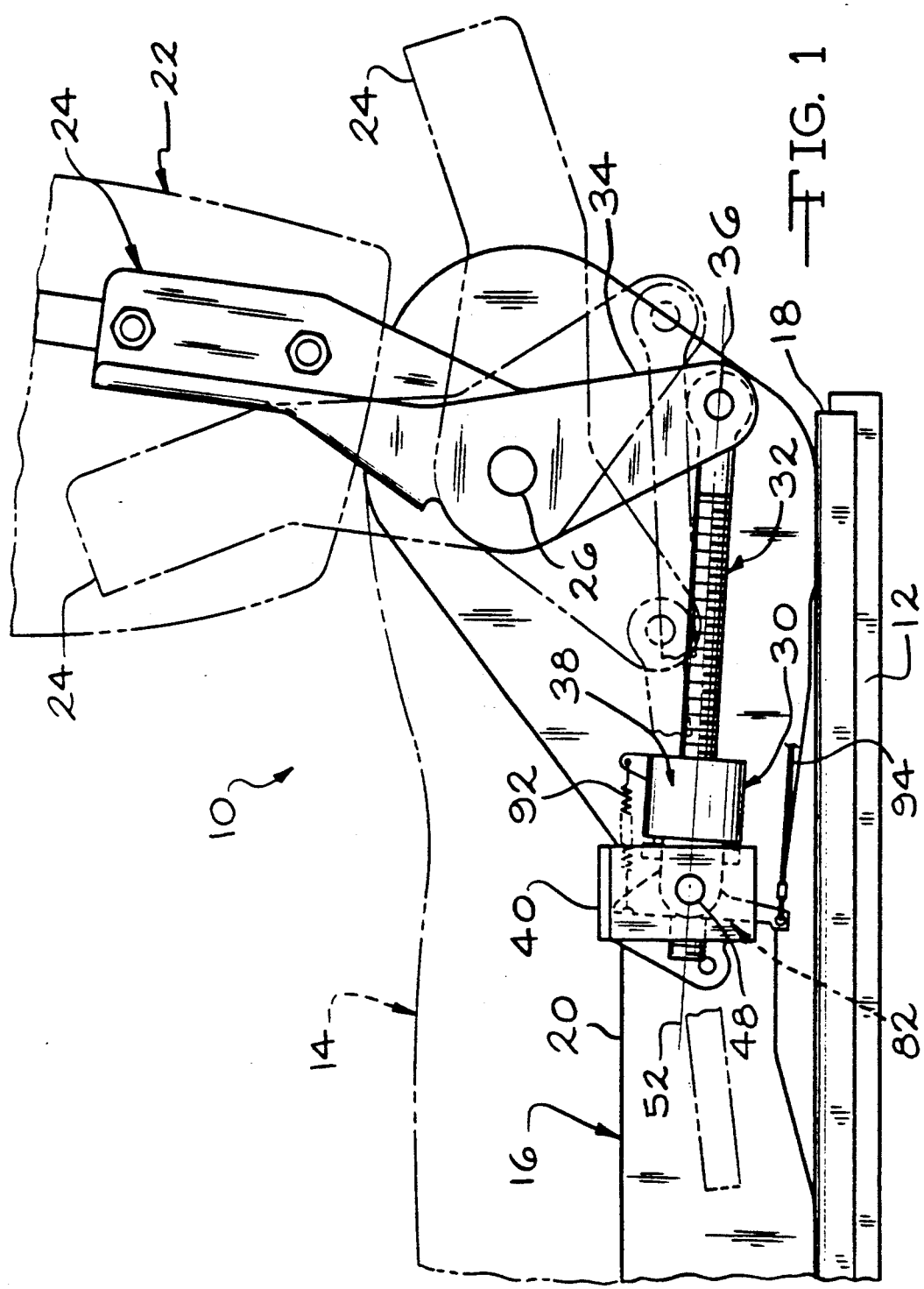
FIG. 1 is a fragmentary side elevational view of the structure of the seat assembly of the present invention showing the linear actuator used as a recliner mechanism.

A seat assembly, having a linear actuator of the present invention for a recliner mechanism, is shown in FIG. 1 and designated generally as 10. Seat assembly 10 includes a base member 12, seat member 14 and back member 22. The base member is attachable to a vehicle floor. The seat member 14 is slidably mounted to the base member 12 and includes a seat frame 16 comprised of a slide rail 18, slidably mounted to the base member 12, and a riser 20. The seat back or back member 22, has a back frame 24 which is pivotally mounted to the riser 20 at a pivot joint 26. The pivotal connection of the back frame to the riser enables the back member to be rotated relative to the seat member as shown by the phantom line positions of the back frame 24. This enables the inclination of the back member 2 to be adjusted relative to the seat member 14 for the comfort of a seat occupant. A linear actuator 30 is used as the recliner mechanism to hold, or lock, the back member 22 in place relative to the seat member.

The actuator 30 includes first and second members 32 and 38 each pivotally mounted to separate, relatively movable components of the seat assembly. The first member 32 is a lead screw 33 attached at a pivot joint 36 to recliner arm 34 of the back frame 24. The recliner arm extends downward below the seat back pivot joint 26 to the lead screw 33. The lead screw 33 is allowed to pivot about the horizontal transverse axis of the pivot joint 36 parallel to the axis of rotation of the back member. The lead screw is not allowed to rotate about its longitudinal axis 52 described below.

The second member 38 of the actuator is pivotally attached to the riser 20 through a mounting bracket 40 at pivot joint 48. Second member 38 includes a housing 42 which includes an internal mechanism, shown in FIGS. 3 and 4 that operates to lock the actuator first member 32 relative to the second member 38, thus locking the back frame 24 to the seat frame 16, preventing relative motion therebetween. The housing 42 has a generally cylindrical side wall 41 and is open at its ends to allow the screw 33 to extend through the housing. A clutch 44 with a central aperture 49 is positioned in one end of the housing. A pair of mounting flanges 46 extend from the side wall 41 and are coupled to the mounting bracket 40 at the pivot joint 48 to mount the housing 42 to the seat frame 16. This allows the second part 38 of the actuator to pivot relative to the seat frame 16 about a transverse axis 50 parallel to the axis of rotation of the back member.

The axis 52 of the screw serves as a central linear axis of the actuator which passes through the points of attachment 36 and 48 of the actuator to the back frame 24 and to the seat frame 16 respectively. The attachment of the screw 33 to the recliner arm 34 of the seat frame 10 comprises an eyelet 54 formed at one end of screw shaft 56 which extends along axis 52. The eyelet 54 comprises a circular aperture 58 and its attachment to the recliner arm 34 is made by a circular pivot pin (not shown) extending through the aperture 58 and a corresponding aperture in the recliner arm 34.

Figure 3:
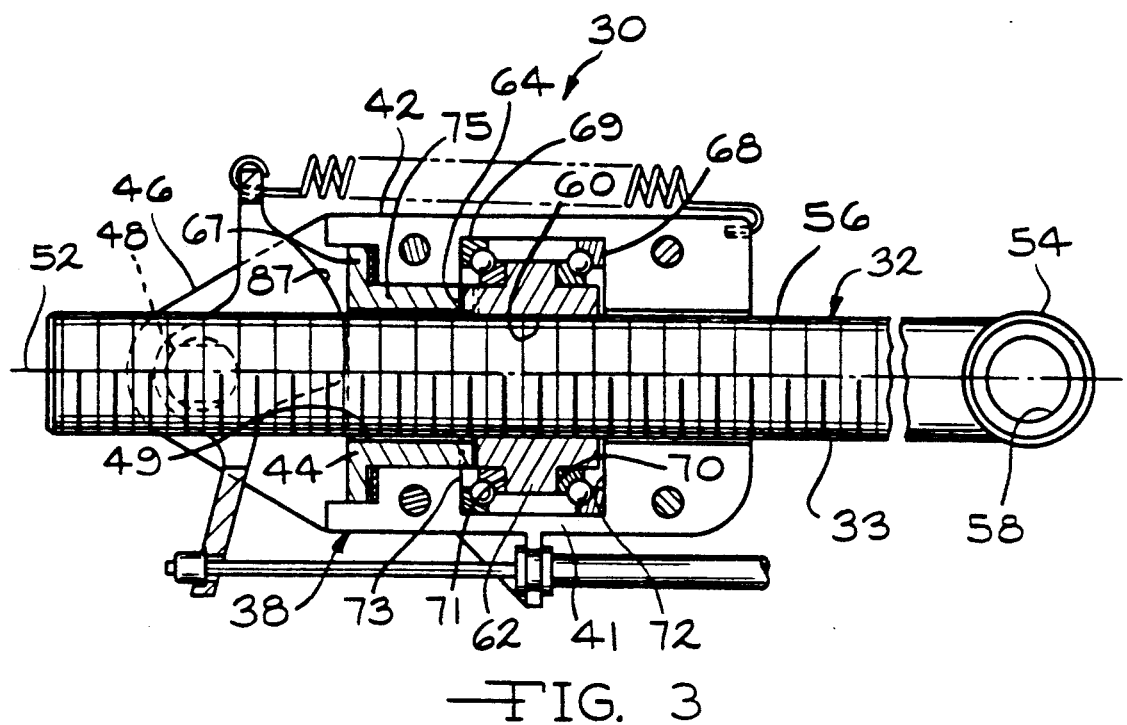
FIG. 3 is a sectional view of the actuator shown in the lock position.
Figure 4:
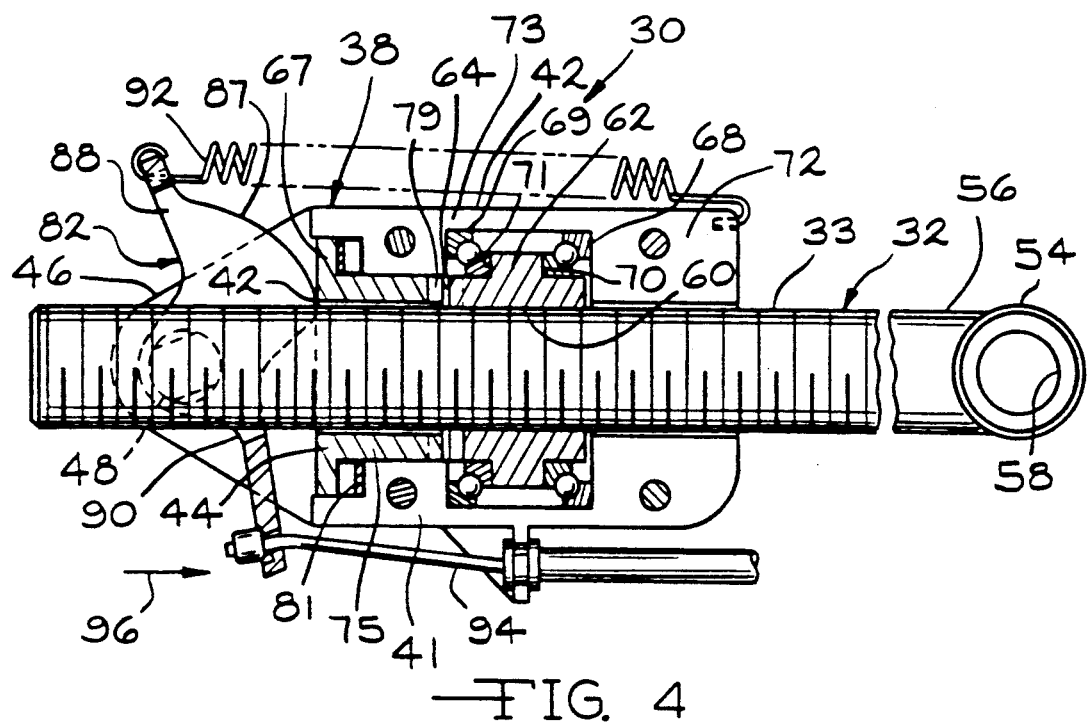
FIG. 4 is a sectional view of the actuator shown in a release position for seat back adjustment.

The shaft 56 is formed on its exterior surface with a threaded portion comprising a plurality of threads extending in the helical fashion around the outside of the shaft over a significant portion of its length as illustrated thus forming the threaded screw. The screw is operatively coupled with a complementary threaded bore 60 of an annular element or spin nut 62 (FIGS. 3 and 4). The annular element 62 as an axial end wall or end face 64 normal to the axis 5 and facing the clutch 44.

The cylindrical side wall 41 of the housing 4 is radially spaced from and surrounds the annular element 62. Angular contact bearings 68 and 69 are positioned between the annular element 62 and the housing side wall 41 to permit rotation of the annular element relative to the housing. The angular contact bearings transmit both radial and axial thrust loads between the annular element and the housing to fully position the housing relative to the screw and spin nut. This is in contrast to the parent application where the bearings were only axial bearings and did not carry radial loads. The radial loading was carried between the screw and housing by a close fitting aperture in the housing for the screw. The bearings 68 and 69 are axially positioned by shoulders 70 and 71 of the annular element and inwardly extending flanges 72 and 73 in the side wall 41. The flanges 72 and 73 axially capture the bearings and annular element within the housing.

The threads of the screw shaft and the annular element have a large enough pitch angle so that an axial force applied to the screw shaft 56 will cause rotation of the annular element. The rotation of the annular element in turn causes it to move axially along the length of the screw shaft.

The clutch 44 includes an end plate 67 and an cylindrical flange 75 extending into the housing, having an inner face 78. The inner face is formed with a plurality of axially projecting radial teeth 79. The teeth 79 engage and intermesh with complementary radial teeth 80, formed in the axial end face 64 of the annular element 62. The engaging clutch and spin nut teeth operate to ensure that the spin nut is locked in place to prevent relative movement of the seat components except during seat adjustment. With the teeth however, the actuator is no longer infinitely variable as is the actuator disclosed in the parent application. The teeth are such that the incremental rotation of the spin nut for engagement of one tooth with the next adjacent tooth produces a small amount of seat back travel. The recliner mechanism appears to the seat occupant to be nearly infinite in its adjustment.

A wave washer 81 or other resilient spring device is positioned between the clutch 44 and the flange 73 to urge the clutch away from the annular element, to a release position in which the clutch teeth are disengaged from the teeth of the annular element. When the teeth are disengaged, the annular element is free to rotate.

With reference to FIG. 3, the clutch 44 is shown in a locked position in which it is forced into the housing 42 by a cam lever 82, described in greater detail below. When the clutch is in the locked position, the wave washer 81 is compressed to the point that the teeth 79 of the clutch engage the teeth 80 of the annular element. This prevents rotation of the annular element 62 about the axis 52. The mounting of the actuator first part, lead screw 33, to the recliner arm 34 prevents rotation of the lead screw about its axis 52. The mounting of the second part, housing 42, to the seat frame 16 precludes rotation of the housing about the axis 52. Therefore, with the annular element 62 being prevented from rotating, the first and second parts of the actuator are fixed in position relative to one another which in turn fixes the back frame 24 in position relative to the seat frame 16.

With reference to FIG. 4, the clutch 44 is shown in a release position in which it has been partially withdrawn from the housing 42. This movement of the clutch is permitted by rotation of the cam lever 82, decreasing the distance between pivot joint 48 and the cam surface 87 along the direction of axis 52. This enables the wave washer 81 to move the clutch 44 axially toward the pivot joint 48, disengaging the clutch teeth from the teeth of the annular element.

When the clutch is in the release position and axial forces are applied to the actuator 30, the pitch angle of the threaded coupling between the shaft 56 and the annular element 62 enables the annular element to rotate about the shaft 56. This causes translation of the annular element along the shaft 56, changing the length of the actuator between the pivot joint 36 and the pivot joint 48.

Figure 2:
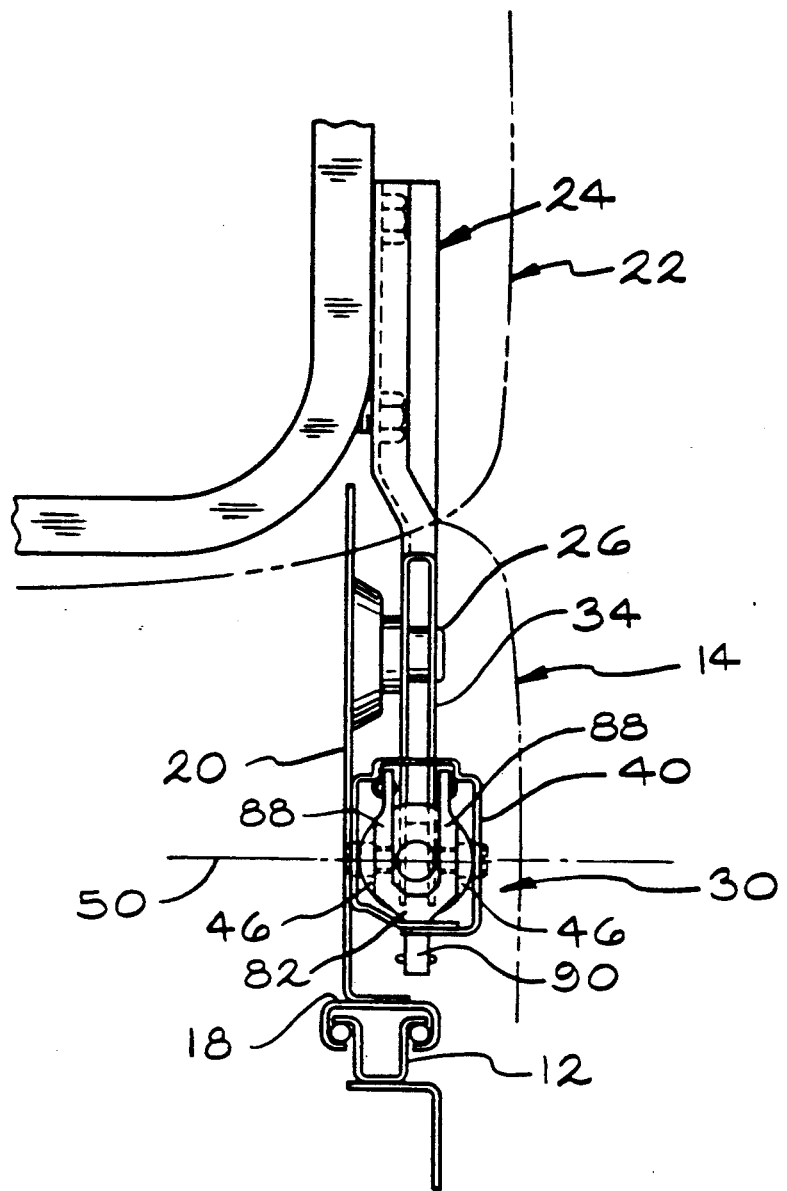
FIG. 2 is a front elevational view of the mechanism shown in FIG. 1.

The cam lever 82, as shown in FIG. 2, is a forked lever having two legs 88 extending from a center portion 90. The cam lever is forked to provide a center clearance for the shaft 56 therebetween. The two legs 88 are each pivotally mounted to the flanges 46 by the pivot joint 48. One or more bias springs 92 are coupled to the legs 88 of the cam lever to bias the cam lever to the locked position shown in FIG. 3. A control wire 94 is connected to the center portion 90, opposite the pivot joint 48 from the bias springs 92 to limit the rotational travel of the cam lever in the direction of rotation urged by the springs 92.

The cam lever 82 has a curved cam surface 87. In the locked position shown in FIG. 3, the clutch 44 is disposed further into housing 42 than when in the release position shown in FIG. 4.

A hand operated control lever (not shown) is coupled to the control wire 94 in a conventional manner to pull on the wire 94 in the direction of the arrow 96 of FIG. 4 to unlock the actuator 30. When the wire 94 is pulled, the cam lever is rotated to the release position, enabling the annular element 62 to spin. This enables adjustment of the back frame 24 relative to the seat frame. Upon release of the lever, the bias springs 92 will automatically return the actuator to the locked position.

Figure 5:
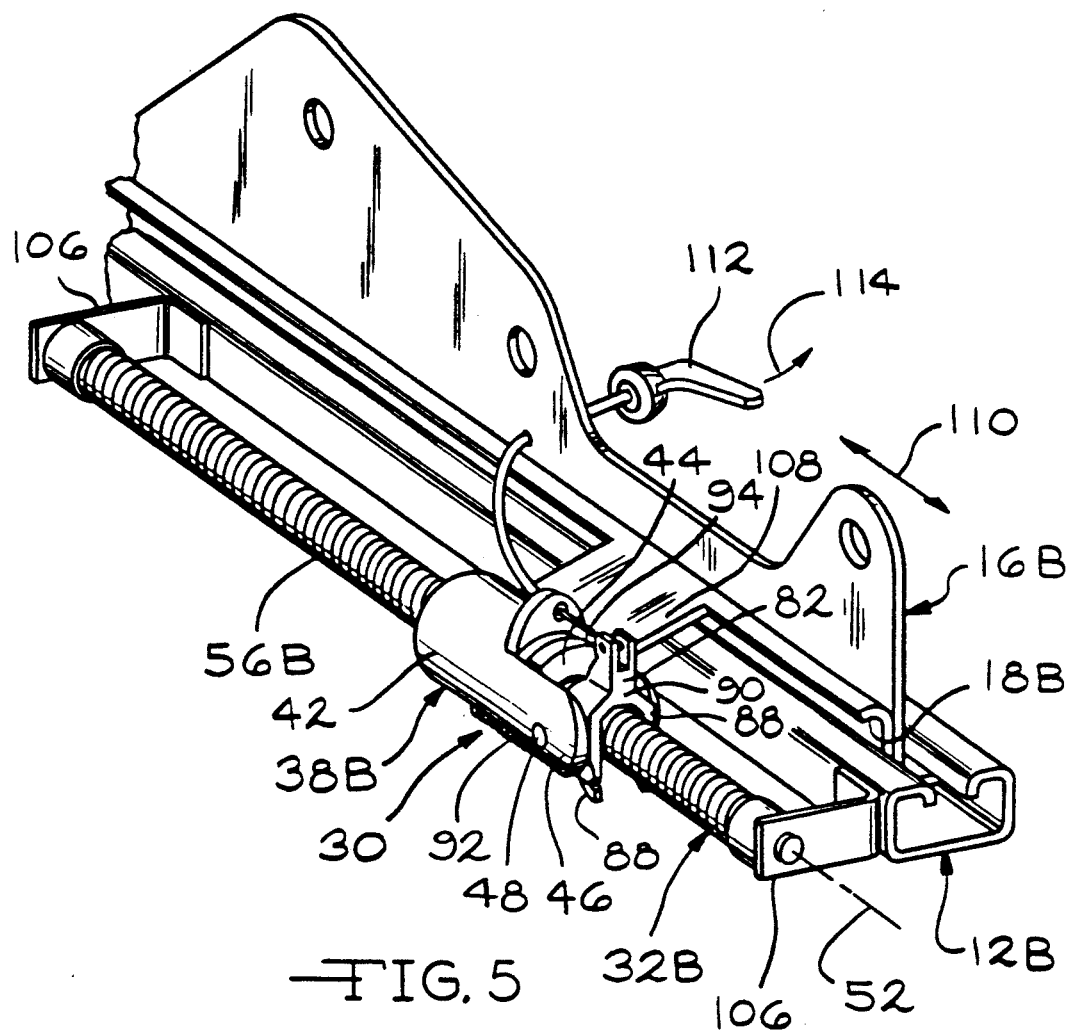
FIG. 5 is a perspective view of a seat structure showing the linear actuator used as a seat adjuster.

With reference to FIG. 5, the infinitely variable actuator 30 is shown in use as a seat adjuster to lock the seat in the fore and aft adjusted position. Components of the seat assembly in FIG. 5 identical to those in FIGS. 1–4 are given the same reference numerals while those components that are similar to that disclosed in FIGS. 1–4 are given the same reference numeral with the suffix "B". In most respects, the actuator of FIG. 5 is identical to the actuator 30 in FIGS. 1–4. The first part of the actuator 32B is a screw shaft 56B that is mounted at its two axial ends to the base member 12B through laterally extending mounting flanges 106. Shaft 56B is not rotatable about the axis 52. The second part 38B of the actuator is the housing 42 mounted to the seat frame 16B through a mounting bracket 108. As in the previous embodiment, the housing 42 is fixed from rotating about the axis 52.

The seat frame 16B is slidably mounted to the base member 12B for fore and aft sliding motion in the direction of arrow 110. With the base part 12B fixed to a vehicle floor pan, movement of the seat frame 16B accomplishes fore and aft adjustment of the seat assembly within the motor vehicle. With the actuator 30 in a locked condition, the annular element 62 within the second part 38B is fixed from rotating and thereby prevents movement of the seat frame 16B relative to the base part 12B. When the wire 94 is pulled by rotation of the release lever 112 in the direction of arrow 114, the cam lever 82 is rotated about the pivot 48, releasing the annular element 62 allowing the element to rotate and the seat frame 16B to move relative to the base part 12B.

The seat assembly may include a second actuator 30 mounted to a base frame 12B and seat frame 16B at the opposite lateral side of the seat assembly. A second wire 94 can be coupled to the additional actuator 30 at the opposite side of the seat assembly and actuated by the release lever 112 for simultaneous release of the two actuators 30.

Figure 6:
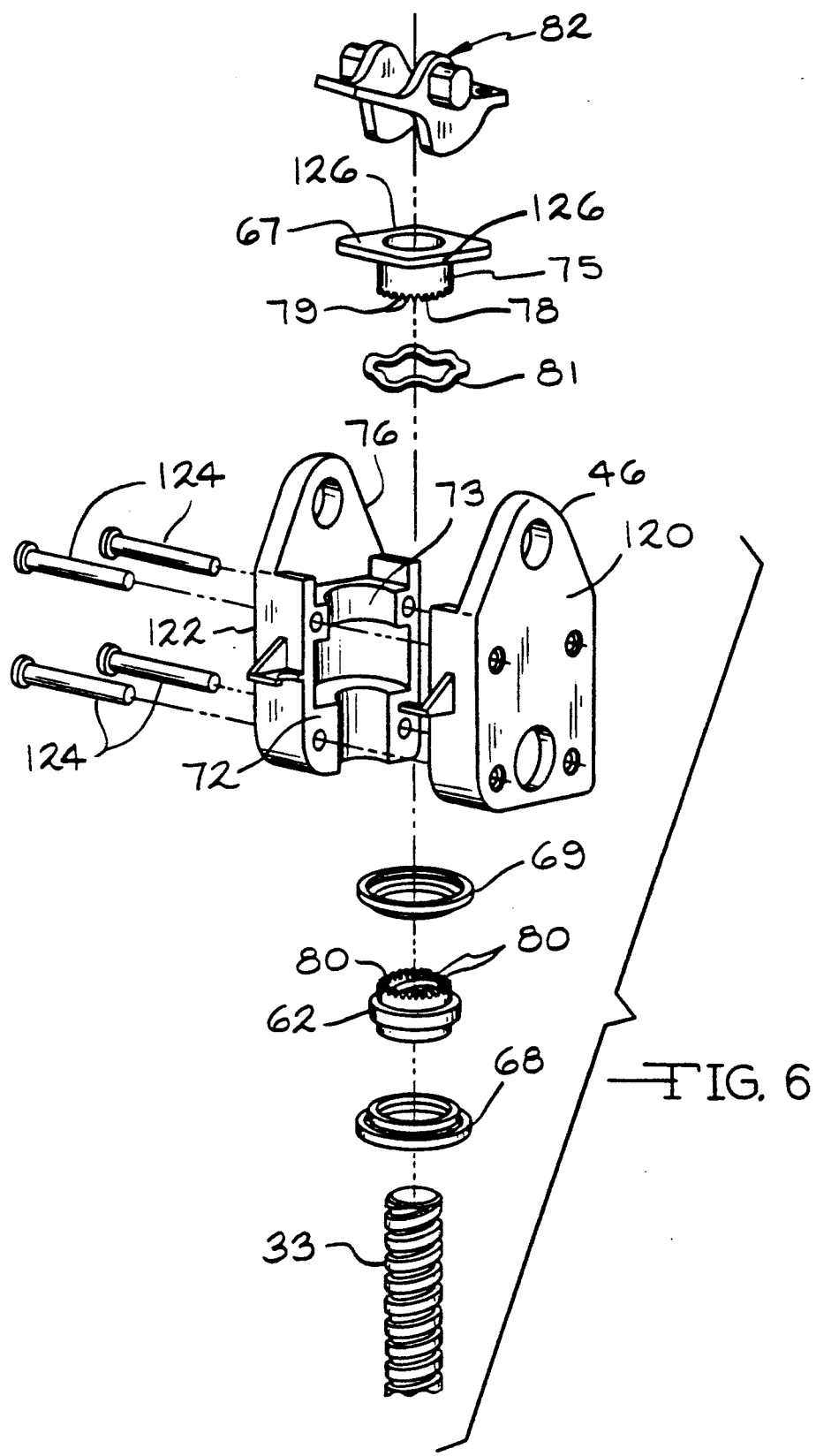
FIG. 6 is an exploded perspective view of the actuator.

With reference to FIG. 6, the housing 42 is constructed of two housing half members 120 and 122. The half members are joined together by a plurality of rivets 124 which extend through the two half members. The housing is assembled around the annular element 62, the bearings 68 and 69, the wave washer 81, the clutch 44 and the cam lever 82. This construction avoids the need for any press fits of the bearings and for any retaining rings. The only fasteners needed are the four rivets 124. The result is a compact, simple and easy to assemble actuator. The end plate 67 of the clutch 44 has flat side edges 126 for contact with the housing flanges 46 to prevent rotation of the clutch.

The seat assembly of the present invention includes a linear actuator used as either a recliner mechanism or a seat adjuster mechanism. The linear actuator operates to prevent a spin nut from rotating along a lead screw to hold the seat components in their relative adjusted positions. By providing the actuator with a cam action release lever, the actuator can be released with the use of a simple pull cable in a manner well know in manually adjustable seat assemblies. The engagable teeth of the clutch and spin nut operate to ensure locking of the spin nut to hold the seat in place.

It is to be understood that the invention is not limited to the exact construction illustrated and described above, but that various changes and modifications may be made without departing from the spirit and scope of the invention as defined in the following claims.

We claim:

1. In a vehicle seat assembly having first and second relatively movable components, an actuator for holding the position of said first component relative to said second component, comprising:

an elongated lead screw having a pair of ends and defining a central linear axis of said actuator, said screw being attached to said first seat assembly component in a manner to prevent rotation of said screw about said axis, said screw having a threaded portion comprising a plurality of threads which extend in a helical fashion around the exterior of said screw;

a spin nut having an internal threaded central bore, said nut being threadably coupled to said screw and being axially movable along said screw in response to rotation of said spin nut about said axis, said nut having axial end walls disposed in planes substantially at right angles to said central axis;

a housing mounted to said second seat assembly component in a manner to prevent rotation of said housing about said axis, said housing having a side wall with two ends and being radially spaced from and surrounding said spin nut whereby said housing contains said spin nut therein and said lead screw extends through said housing;

angular contact bearing means disposed between said spin nut and said housing side wall to permit rotation of said spin nut within said housing and for both axially and radially restraining said spin nut within said housing; and a clutch member slidably disposed in one end of said housing having an inner face in confronting juxtaposition to one end wall of said spin nut, said clutch member being non-rotatable and being axially slidable relative to said housing between a lock position in which said clutch member inner face engages said one end wall of said spin nut and a release position in which said clutch member inner face is disengaged from said one end wall of said spin nut, said inner wall of said clutch member and said one end of said spin nut each having radially extending teeth which engage one another when said clutch member is in said lock position to prevent rotation of said spin nut whereby said two seat assembly components are held in place relative to one another and when said clutch member is in said release position, said teeth are disengaged and said spin nut is free to rotate allowing said seat assembly components to move relative to one another.

2. The actuator of claim 1 wherein said housing is constructed of two housing half members joined together around said spin nut and said angular bearing means, each half member having a pair of spaced opposing semi-circular flanges extending inwardly from said housing side wall to form seats for said angular contact bearing means between said flanges to axially capture said spin nut.

3. The actuator of claim 1 wherein said angular bearing means includes a pair of bearings both radially extending from said spin nut with one bearing extending axially from each end wall of said spin nut; and said housing side wall having a pair of axially spaced annular flanges extending into said housing from said side wall to axially capture said pair of bearings therebetween to axially capture said spin nut within said housing.

4. The actuator of claim wherein said housing is constructed of two housing half members joined together around said spin nut and said pair of bearings and said actuator further comprising a plurality of fasteners for holding said two housing half members together.

5. The actuator of claim 1 further comprising:

yieldable resilient means within said housing to urge said clutch member to said release position whereby said nut is free to rotate; and cam means movably mounted to said housing having a cam surface engaging an outer face of said clutch member, said cam means having a first position in which said cam means holds said clutch member in said lock position in opposition to said yieldable resilient means and said cam means having a second position in which said clutch member is allowed to be moved to said release position by said yieldable resilient means.

6. The actuator of claim 5 further comprising:

bias means for urging said cam means to said first position whereby said spin nut is held from rotation; and release means for selectively moving said cam means in opposition to said bias means to said second position whereby said spin nut is permitted to rotate about said screw.

7. The actuator of claim 5 wherein said cam means includes a forked cam member rotatably mounted to said housing having a base portion extending radially relative to said screw axis to one side of said housing and a pair of spaced parallel legs extending in radially relative to said screw axis to the opposite side of said housing from the base portion of said cam, said legs each having axially protruding cam portions with edge surfaces engaging said outer face of said clutch.

8. The seat assembly of claim 7 wherein said screw extends between said spaced legs of said cam member.

9. The seat assembly of claim 7 further comprising a pair of mounting flanges extending axially from one end of said housing for mounting said housing to said second seat assembly component and for mounting said cam member to said housing.

10. A vehicle seat assembly comprising:

a base portion adapted to be mounted to a vehicle body;

a seat cushion mounted to said base portion;

a seat back mounted to said base portion for rotation about a transverse axis to adjust an angle of inclination of said seat back relative to said seat cushion; and recliner means for holding said seat back in the adjusted position, said recliner means including an actuator having:

an elongated lead screw having a pair of ends and defining a central linear axis of said actuator, said screw being attached at one end to one of said base portion and said seat back in a manner to prevent rotation of said screw about said axis, said screw having a threaded portion comprising a plurality of threads which extend in a helical fashion around the exterior of said screw;

a spin nut having an internal threaded central bore, said nut being threadably coupled to said screw and being axially movable along said screw in response to rotation of said spin nut about said axis, said nut having axial end walls disposed in planes substantially at right angles to said central axis;

a housing mounted to said base portion and said seat back in a manner to prevent rotation of said housing about said axis, said housing having a side wall with two ends and being radially spaced from and surrounding said spin nut whereby said housing contains said spin nut therein and said lead screw extends through said housing;

angular contact bearing means disposed between said spin nut and said housing side wall to permit rotation of said spin nut within said housing and for both axially and radially restraining said spin nut within said housing; and a clutch member slidably disposed in one end of said housing having an inner face in confronting juxtaposition to one end wall of said spin nut, said clutch member being non-rotatable and being axially slidable relative to said housing between a lock position in which said clutch member inner face engages said one end wall of said spin nut and a release position in which said clutch member inner face is disengaged from said one end wall of said spin nut, said inner wall of said clutch member and said one end of said spin nut each having radially extending teeth which engage one another when said clutch member is in said lock position to prevent rotation of said spin nut whereby said seat back is held in place relative to said base portion and when said spin nut is in said release position, said threads are disengaged and said spin nut is free to rotate allowing said seat back to move relative to said base portion.

11. The actuator of claim 10 wherein said housing is constructed of two housing half members joined together around said spin nut and said angular bearing means, each half member having a pair of spaced opposing semi-circular flanges extending inwardly from said housing side wall to form seats for said angular bearing means between said flanges to axially capture said spin nut.

12. The actuator of claim 10 wherein said angular bearing means includes a pair of bearings both radially extending from said spin nut with one bearing extending axially from each end wall of said spin nut; and said housing side wall having a pair of axially spaced annular flanges extending into said housing from said side wall to axially capture said pair of bearings therebetween and to axially capture said spin nut within said housing.

13. The actuator of claim 12 wherein said housing is constructed of two housing half members joined together around said spin nut and said pair of bearings and said actuator further comprising a plurality of fasteners for holding said two housing half members together.

* * * * *

UNITED STATES PATENT AND TRADEMARK OFFICE
CERTIFICATE OF CORRECTION

PATENT NO. : 5,320,413
DATED : June 14, 1994
INVENTOR(S) : Leslie Griswold; Mark Graf; John Flannery; Cynthia L. Hernandez; Srinivas Bidare; Obert Burch and David Pawczuk It is certified that error appears in the above-indentified patent and that said Letters Patent is hereby corrected as shown below:

In Column 2 line 40, after "back member" delete "2" and insert —22—.

In Column 3 line 26, after "housing" delete "4" and insert —42—.

In Column 3 line 25, after "axis" delete "5" and insert —52—.

In Column 6 line 63, Claim 4, after "claim" insert —1—.

Signed and Sealed this

Fifteenth Day of November, 1994

Attest:

BRUCE LEHMAN

Attesting Officer

Commissioner of Patents and Trademarks